(12) United States Patent
Komai et al.

(10) Patent No.: US 11,838,266 B2
(45) Date of Patent: Dec. 5, 2023

(54) IP ADDRESS ASSIGNMENT APPARATUS, IP ADDRESS ASSIGNMENT METHOD AND PROGRAM

(71) Applicant: NIPPON TELEGRAPH AND TELEPHONE CORPORATION, Tokyo (JP)

(72) Inventors: Yuka Komai, Musashino (JP); Masahiro Kobayashi, Musashino (JP); Shigeaki Harada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 90 days.

(21) Appl. No.: 17/596,116

(22) PCT Filed: Jun. 6, 2019

(86) PCT No.: PCT/JP2019/022475
§ 371 (c)(1),
(2) Date: Dec. 3, 2021

(87) PCT Pub. No.: WO2020/245966
PCT Pub. Date: Dec. 10, 2020

(65) Prior Publication Data
US 2022/0247716 A1 Aug. 4, 2022

(51) Int. Cl.
*H04L 12/851* (2013.01)
*H04L 29/12* (2006.01)
(Continued)

(52) U.S. Cl.
CPC ...... *H04L 61/5069* (2022.05); *H04L 47/2441* (2013.01); *H04L 61/5007* (2022.05); *H04W 8/26* (2013.01); *H04L 2101/668* (2022.05)

(58) Field of Classification Search
CPC ........... H04L 43/02; H04L 43/08–0894; H04L 61/50; H04L 61/5007; H04W 8/26
See application file for complete search history.

(56) References Cited

U.S. PATENT DOCUMENTS 6,385,204 B1 * 5/2002 Hoefelmeyer ...... H04L 12/4604
370/402
9,282,077 B2 * 3/2016 Gundavelli ........... H04W 72/04
(Continued)

OTHER PUBLICATIONS

Yuka Komai, Tatsuaki Kimura, Masahiro Kobayashi, and Shigeaki Harada, Traffic Prediction by Extracting Users' Access Patterns for Proactive Controlled Network, IEICE General Conference, 2019.

Primary Examiner — Boris D Grijalva Lobos
(74) Attorney, Agent, or Firm — IPUSA, PLLC (57) ABSTRACT

An IP address assigning device can reduce registration information required for controlling traffic by calculating, for traffic between a plurality of user terminals and a plurality of services in a past period, a statistic of the traffic for each of a plurality of combinations of a user terminal, a service, and a time period, and extracting a plurality of patterns relating to the traffic based on a plurality of the statistics; classifying the plurality of user terminals into a plurality of groups based on the patterns; and assigning IP addresses belonging to a subnetwork to corresponding ones of the plurality of user terminals for each of the plurality of groups.

6 Claims, 12 Drawing Sheets

(51) Int. Cl.
*H04L 61/5069* (2022.01)
*H04L 61/5007* (2022.01)
*H04L 47/2441* (2022.01)
*H04W 8/26* (2009.01)
*H04L 101/668* (2022.01)

(56) References Cited

U.S. PATENT DOCUMENTS

| | | | | |
|---|---|---|---|---|
| 10,091,100 | B1* | 10/2018 | Duerk | H04L 47/621 |
| 2017/0359303 | A1* | 12/2017 | Szamonek | H04L 61/5007 |
| 2019/0306324 | A1* | 10/2019 | Al-Mehdar | H04W 4/24 |

\* cited by examiner

| TIMESTAMP | USER ID | SERVICE NAME | (MEASURED VALUE) |
|---|---|---|---|

TWO-DIMENSIONAL ARRAY A

| | TIME PERIOD 1 | TIME PERIOD 2 | ... | TIME PERIOD a |
|---|---|---|---|---|
| PATTERN 1 | 0.8 | 0.4 | ... | 0.1 |
| PATTERN 2 | 0.1 | 0.1 | ... | 0.9 |
| ... | ... | ... | ... | ... |
| PATTERN k | 0.5 | 0.7 | ... | 0.2 |

TWO-DIMENSIONAL ARRAY B

| | SERVICE 1 | SERVICE 2 | ... | SERVICE n |
|---|---|---|---|---|
| PATTERN 1 | 2.4 | 0.4 | ... | 0.1 |
| PATTERN 2 | 0.5 | 0.1 | ... | 1.6 |
| ... | ... | ... | ... | ... |
| PATTERN k | 0.2 | 1.2 | ... | 0.2 |

TWO-DIMENSIONAL ARRAY C

| | USER ID1 | USER ID2 | ... | USER IDm |
|---|---|---|---|---|
| PATTERN 1 | 0.8 | 1.4 | ... | 0.1 |
| PATTERN 2 | 2.1 | 0.1 | ... | 0.3 |
| ... | ... | ... | ... | ... |
| PATTERN k | 0.1 | 0.6 | ... | 1.5 |

Fig. 7

| USER ID | SERVICE NAME | TIME PERIOD | GROUP |
|---------|--------------|-------------|---------|
| USER ID1 | * | * | GROUP 2 |
| USER ID2 | * | * | GROUP 1 |
| USER ID3 | * | * | GROUP 3 |
| ... | | | |

Fig. 8

| USER ID | SERVICE NAME | TIME PERIOD | GROUP |
|---------|--------------|-------------|---------|
| USER ID1 | SERVICE 1 | * | GROUP 1 |
| USER ID1 | SERVICE 2 | * | GROUP 2 |
| USER ID1 | SERVICE 3 | * | GROUP 3 |
| USER ID2 | SERVICE 1 | * | GROUP 1 |
| USER ID2 | SERVICE 2 | * | GROUP 2 |
| USER ID2 | SERVICE 3 | * | GROUP 3 |
| USER ID3 | SERVICE 1 | * | GROUP 3 |
| USER ID3 | SERVICE 2 | * | GROUP 3 |
| USER ID3 | SERVICE 3 | * | GROUP 3 |
| ... | | | |

Fig. 9

|  | ORIGINAL IP ADDRESS | NEW IP ADDRESS |  |
|---|---|---|---|
| GROUP 1 | a.b.c.d<br>a.b.d.e<br>a.b.e.d<br>... | a.a.a.1<br>a.a.a.2<br>a.a.a.3 | CONTROL USING a.a.a.0 |
| GROUP 2 | a.b.c.e<br>a.b.b.d<br>... | a.a.b.1<br>a.a.b.2 | CONTROL USING a.a.b.0 |

Fig. 10

|  | ORIGINAL IP ADDRESS | NEW IP ADDRESS |
|---|---|---|
| USER ID1 | a.b.c.d | a.a.a.1 |
| USER ID2 | a.b.d.e | a.a.a.2 |
| USER ID3 | a.b.c.e | a.a.b.1 |
|  | ... |  |

CONTROL EXAMPLE
GROUP 1: (a.a.a.0) & SERVICE 1
GROUP 2: (a.a.a.0) & SERVICE 2
GROUP 3: (a.a.0.0) & SERVICE *

IP ADDRESS ASSIGNMENT APPARATUS, IP ADDRESS ASSIGNMENT METHOD AND PROGRAM

TECHNICAL FIELD

The present invention relates to an IP address assigning device, an IP address assigning method, and a program.

BACKGROUND ART

In order to avoid deterioration of communication quality due to network congestion, a network operator sequentially monitors the status of a network and performs appropriate communication path control and additional facility installation.

However, in recent years, mobile terminals and Internet of Things (IoT) devices have rapidly spread, many services have come to be provided, and required communication quality (requested communication quality) has diversified. Examples of diversification of the requested communication quality include a relay distribution service requiring a large amount of communication and an ultralow delay, a service that has a low capacity and can tolerate a delay such as collection of data from installed sensors, and the like.

Given that the requested communication quality has diversified, in order to maintain high communication quality, controlling a path of traffic based on requested communication quality is assumed to be effective. For example, in a situation in which there is a likelihood of congestion occurring, by diverting traffic of a service that can tolerate a delay to a path avoiding a congested link, the communication quality of other communication can be maintained.

In order to realize path control as described above, in Non Patent Literature 1, a method for predicting traffic for each requested communication quality has been proposed. More specifically, in Non Patent Literature 1, requested communication quality strongly depends on a service and the terminal environments (OS, terminal type, and the like) of users, and thus the requested communication qualities are assumed to be similar in a case where the service uses of users are similar, traffic is grouped based on similarities between access patterns (service, user, traffic time series variations), and prediction and path control are performed with high accuracy in grouped units. In this way, control in units based on requested communication quality, which has not been considered in the related art, can be realized.

CITATION LIST

Non Patent Literature

Non Patent Literature 1: Yuka Komai, Tatsuaki Kimura, Masahiro Kobayashi, and Shigeaki Harada, "Traffic Prediction Technique Based on Access Pattern for Realizing a Proactive Control-type Network," IEICE General Conference, b 2019

SUMMARY OF THE INVENTION

Technical Problem

In Non Patent Literature 1, a group is associated with combinations of each service and each user (for example, a destination IP address and a transmission source IP address). This group is based on similarities between access patterns, and thus various IP addresses are present within the same group (IP addresses of the same subnetwork are not associated with the same group). For this reason, in order to simply realize path control in units of groups based on requested communication quality, it is necessary to register a control rule in a routing table for all the combinations of each service and each user.

Assuming that, basically, a user's access trend is continuous (does not dynamically change), even when grouping is regularly executed, there are many users who are associated with the same group. On the other hand, there are also users who are associated with a different group every time grouping is performed. For the latter users, it is necessary to change the control rule every time grouping is performed.

However, there is a limit (the memory capacity limit of a switch) in the number of users that can be registered in a routing table using a flow control technology such as OpenFLow. In addition, when the number of registrations or the number of changes increases, more time is necessary for the process, and the communication quality is expected to decrease. In particular, in a large-scale network, the number of combinations of services and users and the number of users associated with different groups are very large, and thus performing path control with all the combinations registered may be impossible or cause deterioration of the communication quality. In such a case, it becomes difficult to perform control in units of groups based on requested communication quality.

The present invention is realized in view of the points described above, and an object thereof is to enable reduction of registration information required for controlling traffic.

Means for Solving the Problem

Thus, in order to solve the problems described above, an IP address assigning device includes an extraction unit configured to calculate, for traffic between a plurality of user terminals and a plurality of services in a past period, a statistic of the traffic for each of a plurality of combinations of a user terminal, a service, and a time period, and extract a plurality of patterns relating to the traffic based on a plurality of the statistics; a classification unit configured to classify the plurality of user terminals into a plurality of groups based on the patterns; and an assignment unit configured to assign IP addresses belonging to a subnetwork to corresponding ones of the plurality of user terminals for each of the plurality of groups.

Effects of the Invention

Registration information required for controlling traffic can be reduced.

DESCRIPTION OF EMBODIMENTS

An embodiment of the present invention will be described below with reference to the drawings. In this embodiment, terms are defined as follows.

The terms "communication" and "traffic" are synonymous with "communication traffic" and refer to communication data that flows over a network.

"Access" refers to generation of communication for a service by a user.

"Service" refers to a service provided by a distribution source of content and is provided by a service provider using a server.

In this embodiment, users are grouped based on requested communication quality, and IP addresses are respectively assigned to the users such that the IP addresses belong to the same subnetwork in units of the groups. In accordance with this, in a case where a routing table enabling a subnetwork denotation and a regular expression can be used and the same path control is realized in units of groups, the groups can be routed in units of subnetworks. Thus, a control rule does not need to be registered in the routing table for IP addresses of all the users, and it is sufficient to only register the number of groups.

In addition, when an IP address is to be assigned, an IP address of a subnetwork other than subnetworks assigned to groups is assigned to a user associated with a different group at each time of grouping. Such a user may have an unstable access pattern, and there is a likelihood of a control rule in units of groups not being appropriate for the user. By applying a new control rule to a group of such users as a new group, the need to frequently change the rule can be reduced.

In accordance with this, routing can be performed in units of subnetworks, and thus registration not of the number of user IP addresses but only of the number of groups in the routing table is sufficient. For this reason, an excessive increase in the number of combinations can be inhibited, and control in units of groups based on requested communication quality can be realized.

Figure 1:
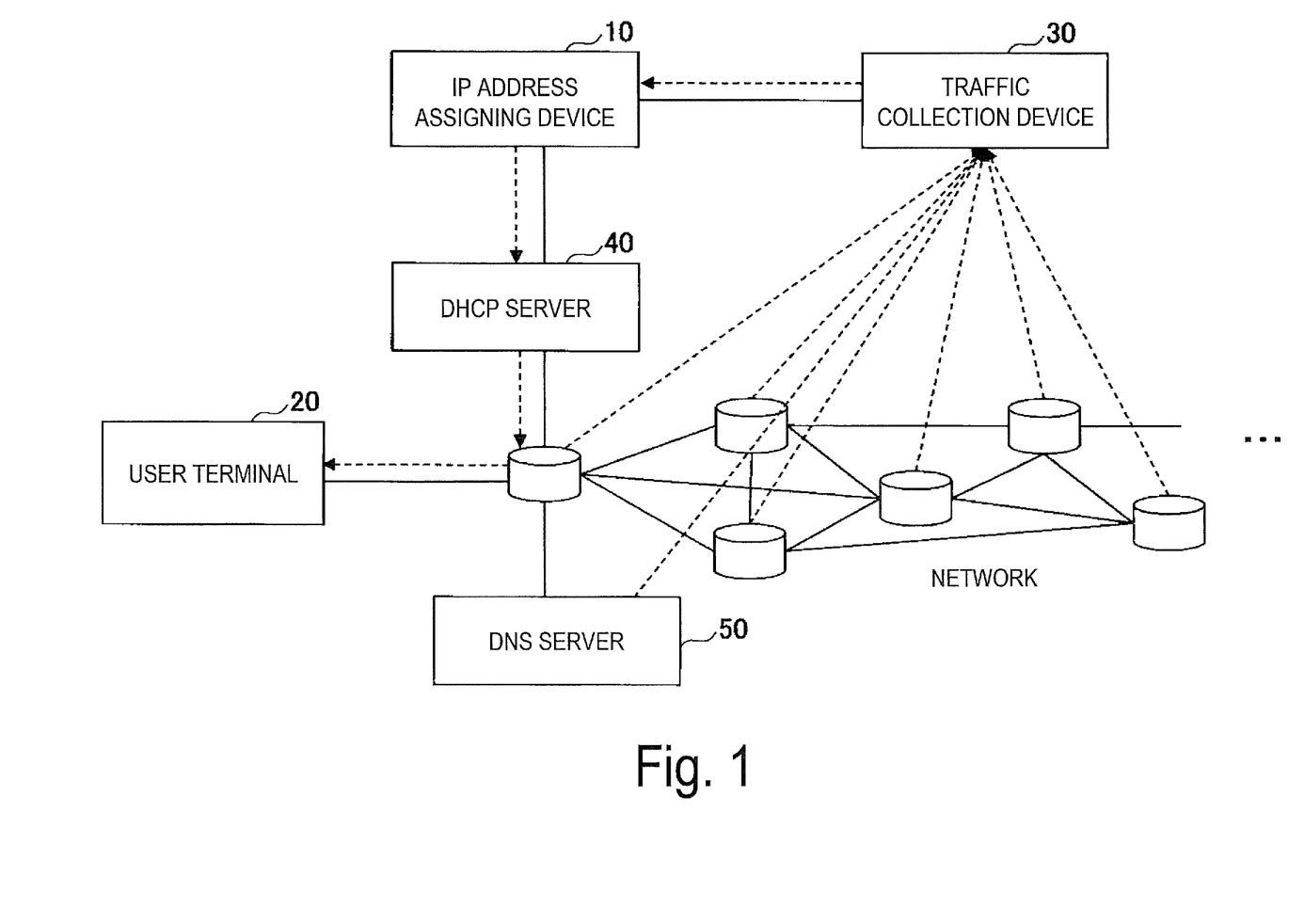
FIG. 1 is a diagram illustrating a system configuration example according to a first embodiment.

FIG. 1 is a diagram illustrating a system configuration example according to a first embodiment. In FIG. 1, a traffic collection device 30 is one or more computers that collect and accumulate traffic logs without affecting any communication in a network. Although a recording destination of traffic logs is assumed to be a main memory of the traffic collection device 30 or a recording device, an arbitrary recording destination may be used.

Figure 2:
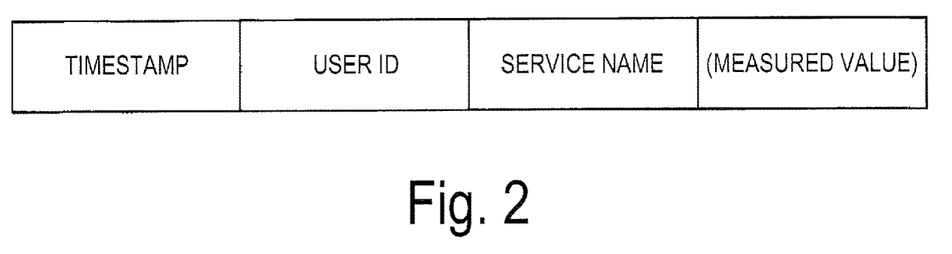
FIG. 2 is a diagram illustrating a configuration example of a traffic log.

FIG. 2 is a diagram illustrating a configuration example of a traffic log. As illustrated in FIG. 2, a traffic log includes a timestamp, a user ID, a service name, a measured value, and the like.

The timestamp is a date and time at which a user terminal 20 has accessed a service. The user ID is an identifier (for example, an IP address) of the user terminal 20 that is an access source. The service name is an identifier of a service that is an access destination (a DNS cache server or a content server). More specifically, a host name in the case of HTTP traffic and a Fully Qualified Domain Name (FQDN) in a DNS query are examples of the service name. The measured value is a traffic volume generated when the user terminal 20 accesses a service. Here, this measured value is arbitrary, and the measured value may be omitted, and a traffic log may be used.

In FIG. 1, the IP address assigning device 10 is one or more computers that change the IP address of the user terminal 20 by registering an assigned IP address in a Dynamic Host Configuration Protocol (DHCP) server 40. The DHCP server 40 is one or more computers that notify the user terminal 20 of a corresponding IP address in response to an IP address assignment request from the user terminal 20. By the DHCP server 40 notifying the user terminal 20 of an IP address registered by the IP address assigning device 10, a change of the IP address that is performed by the IP address assigning device 10 is reflected in the user terminal 20. However, in a case where the IP address of the user terminal 20 can be changed by changing an assignment list of IP addresses as in the case of Network Address Translation (NAT), the IP address assigning device 10 may change the assignment list. In other words, a method of reflecting an IP address after a change in the user terminal 20 may be appropriately selected.

Figure 3:
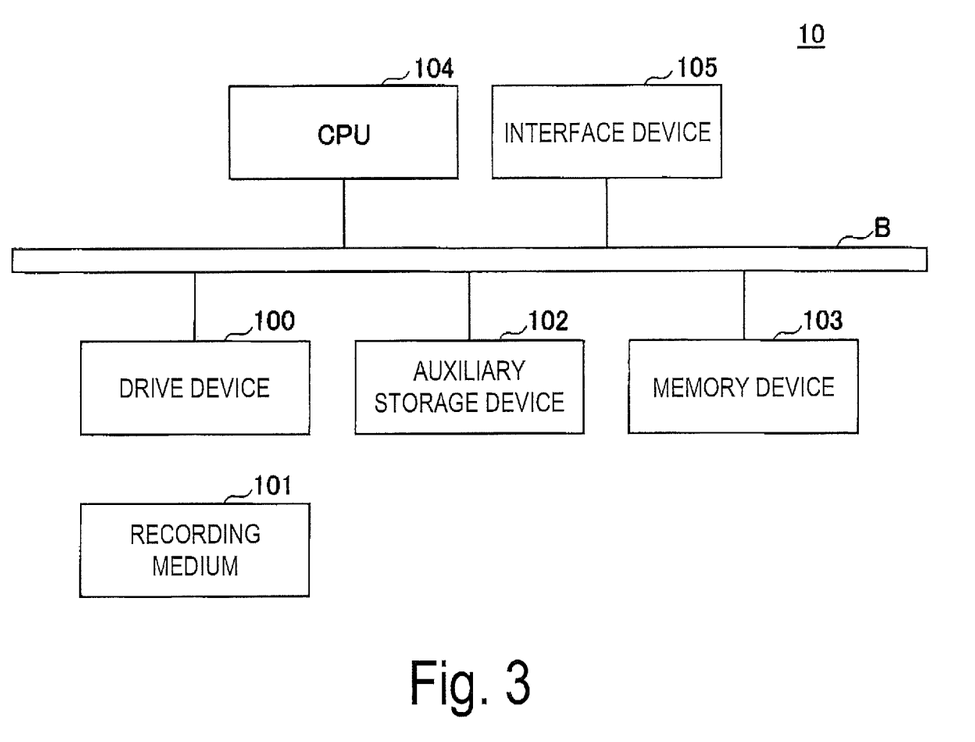
FIG. 3 is a diagram illustrating a hardware configuration example of an IP address assigning device 10 according to the first embodiment.

FIG. 3 is a diagram illustrating a hardware configuration example of an IP address assigning device 10 according to the first embodiment. The IP address assigning device 10 illustrated in FIG. 3 includes a drive device 100, an auxiliary storage device 102, a memory device 103, a CPU 104, an interface device 105, and the like, which are interconnected through a bus B.

A program for realizing the processes of the IP address assigning device 10 is provided using a recording medium 101 such as a CD-ROM. When the recording medium 101 in which a program is stored is set in the drive device 100, the program is installed in the auxiliary storage device 102 from the recording medium 101 through the drive device 100. However, the program is not necessarily installed by the recording medium 101, and may be downloaded from another computer through a network. The auxiliary storage device 102 stores the installed program and stores necessary files, data, and the like.

In a case where an instruction for starting a program has been given, the memory device 103 reads the program from the auxiliary storage device 102 and stores the program. The CPU 104 executes functions relating to the IP address assigning device 10 in accordance with the program stored in the memory device 103. The interface device 105 is used as an interface for connection to a network.

Figure 4:
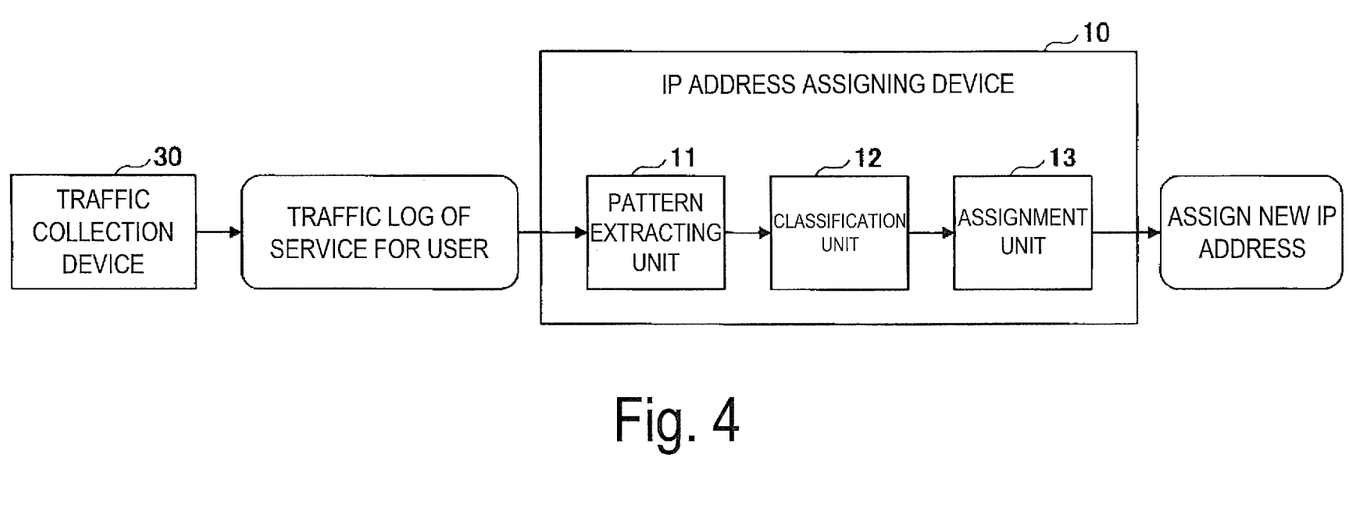
FIG. 4 is a diagram illustrating a functional configuration example of the IP address assigning device 10 according to the first embodiment.

FIG. 4 is a diagram illustrating a functional configuration example of the IP address assigning device 10 according to the first embodiment. In FIG. 4, the IP address assigning device 10 includes a pattern extracting unit 11, a classification unit 12, and an assignment unit 13. Each of these units is realized by one or more programs installed in the IP address assigning device 10 causing the CPU 104 to execute processes.

The pattern extracting unit 11 processes a traffic log (FIG. 2) into data in a format that is appropriate for extracting an access pattern. The pattern extracting unit 11 analyzes the processed data as an input and extracts an arbitrary number of representative access patterns from the input data. In addition, the pattern extracting unit 11 additionally calculates "a degree of relevance" representing a degree of relevance of an item of each axis of input data for each access pattern.

The classification unit 12 associates each user ID or each combination of a user ID and a service with a group (classifies each user ID or each combination into groups) using the degree of relevance that is an output of the pattern extracting unit 11.

The assignment unit 13 receives an output of the classification unit 12 as an input and assigns an IP address to each of a plurality of the user terminals 20 such that IP addresses of the user terminals 20 are in the same subnetwork in units of groups.

Figure 5:
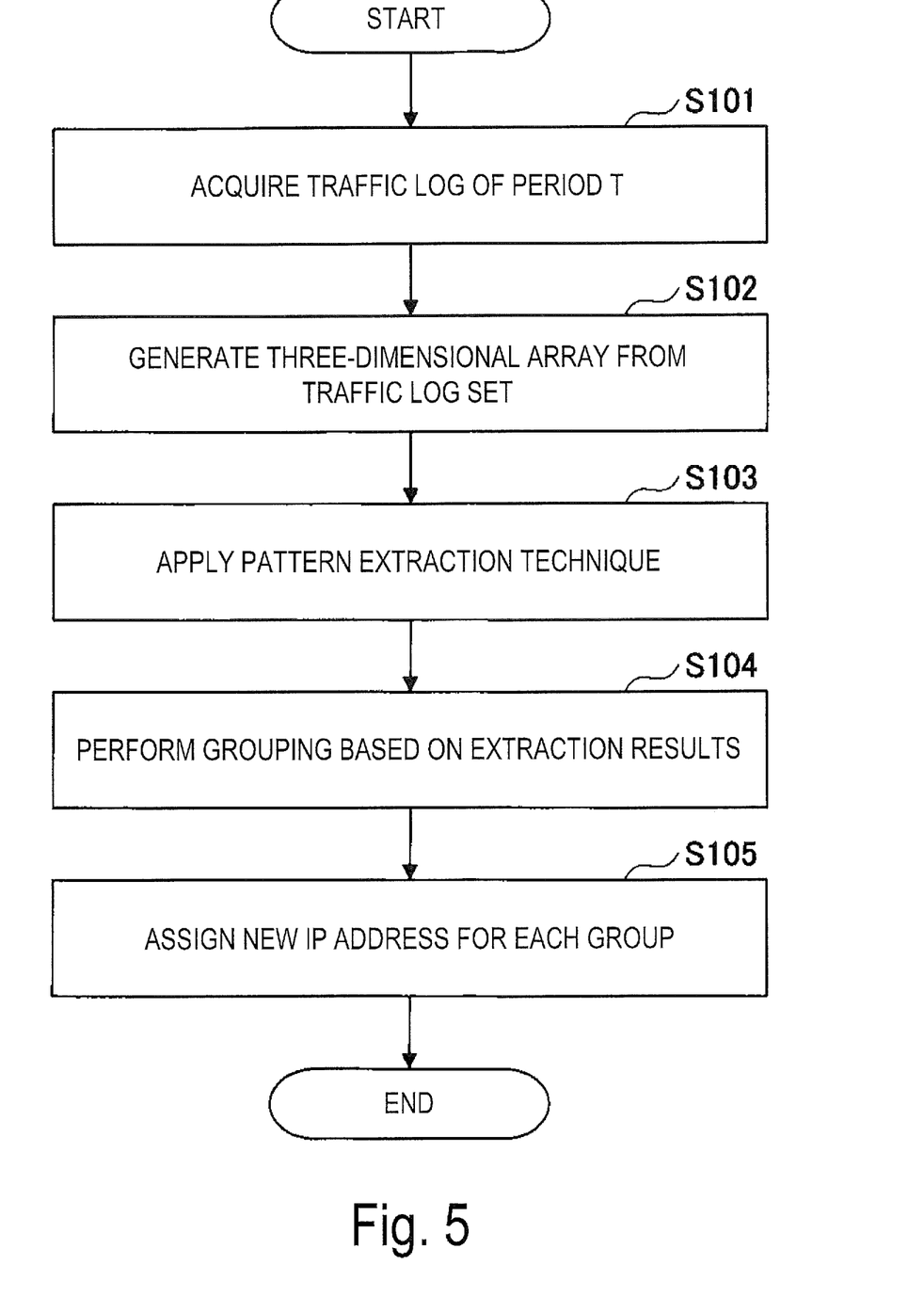
FIG. 5 is a flowchart illustrating an example of a processing sequence executed by the IP address assigning device 10 according to the first embodiment.

Hereinafter, a processing sequence executed by the IP address assigning device 10 will be described. FIG. 5 is a flowchart illustrating an example of a processing sequence executed by the IP address assigning device 10 according to the first embodiment. For example, the processing sequence illustrated in FIG. 5 may be performed every predetermined period (every period T).

In step S101, the pattern extracting unit 11 acquires a set of traffic logs of which timestamps are included in a certain period T in the past (from a prediction start time e to a past time (a× time width b)) from the traffic collection device 30. Here, a and b are arbitrary numerical values that are set in advance by a person performing an analysis. As a becomes larger, a traffic occurrence pattern based on traffic logs of a longer period can be extracted. In addition, b is a time width that represents time granularity of prediction and is used for discretizing time. For example, in a case where b=one hour, a statistic described below is calculated for traffic in units of one hour.

Subsequently, the pattern extracting unit 11 generates (calculates) a three-dimensional array X (a statistic for each combination of a user ID, a service name, and a time period) that represents a relationship between a user ID, a service name, and a timestamp (time period) for the acquired set of traffic logs (S102).

Figure 6:
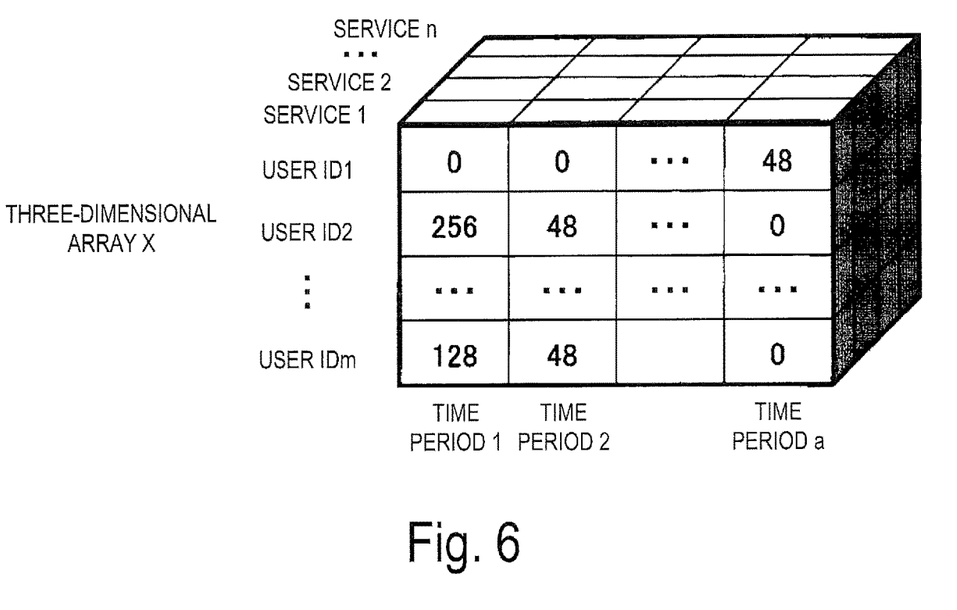
FIG. 6 is a diagram illustrating an example of a three-dimensional array X.

FIG. 6 is a diagram illustrating an example of the three-dimensional array X. As illustrated in FIG. 6, the three-dimensional array X is data having items of each user ID, each service name, and each time period as axes. The data for each combination of items includes a statistic corresponding to the combination (the calculation method of the statistic will be described later) obtained from the set of traffic logs as elements. For example, a statistic v for a certain user ID=u, a certain service name=s, and a certain time period=t (here, t is e−b×(a−t+1) to e−b×(a−t)) may be calculated using one method out of (1) and (2) described below.

(1) Case where access pattern is extracted based on measured value v=process (sum (measured values in traffic logs for user ID=u and service name=s that are included in a time period t))

(2) Case where access pattern is extracted based on user ID and the number of uses of service v=process (count (traffic logs for user ID=u and service name=s that are included in time period t))

Here, count ( ) is the number of corresponding traffic logs. In addition, sum ( ) is a sum of corresponding measured values. Furthermore, process ( ) is an operation of outputting input values with a magnitude relation maintained, and, for example, may be given as process (x)=x, process (x)=log(x), or the like.

In (1), in a case where measured values are set as traffic amounts, a sum value (a traffic amount) of traffic occurring in each time period for a service having a user ID as an access source is handled as a statistic. In (2), the number of accesses of a service having a user ID as an access source in each time period is handled as a statistic. In FIG. 6, an example of a three-dimensional array generated using the method (1) described above is illustrated.

Subsequently, the pattern extracting unit 11 applies a pattern extraction technique to the data (the three-dimensional array X) generated in step S102 (S103). The pattern extracting unit 11 extracts an arbitrary number of (a plurality of) representative access patterns from input data by applying the pattern extraction technique and calculates "a degree of relevance" representing a degree of relevance of the item of each axis of input data to each access pattern. The pattern extracting unit 11 acquires three two-dimensional arrays A, B, and C from the three-dimensional array X as output results according to the pattern extraction technique.

Figure 7:
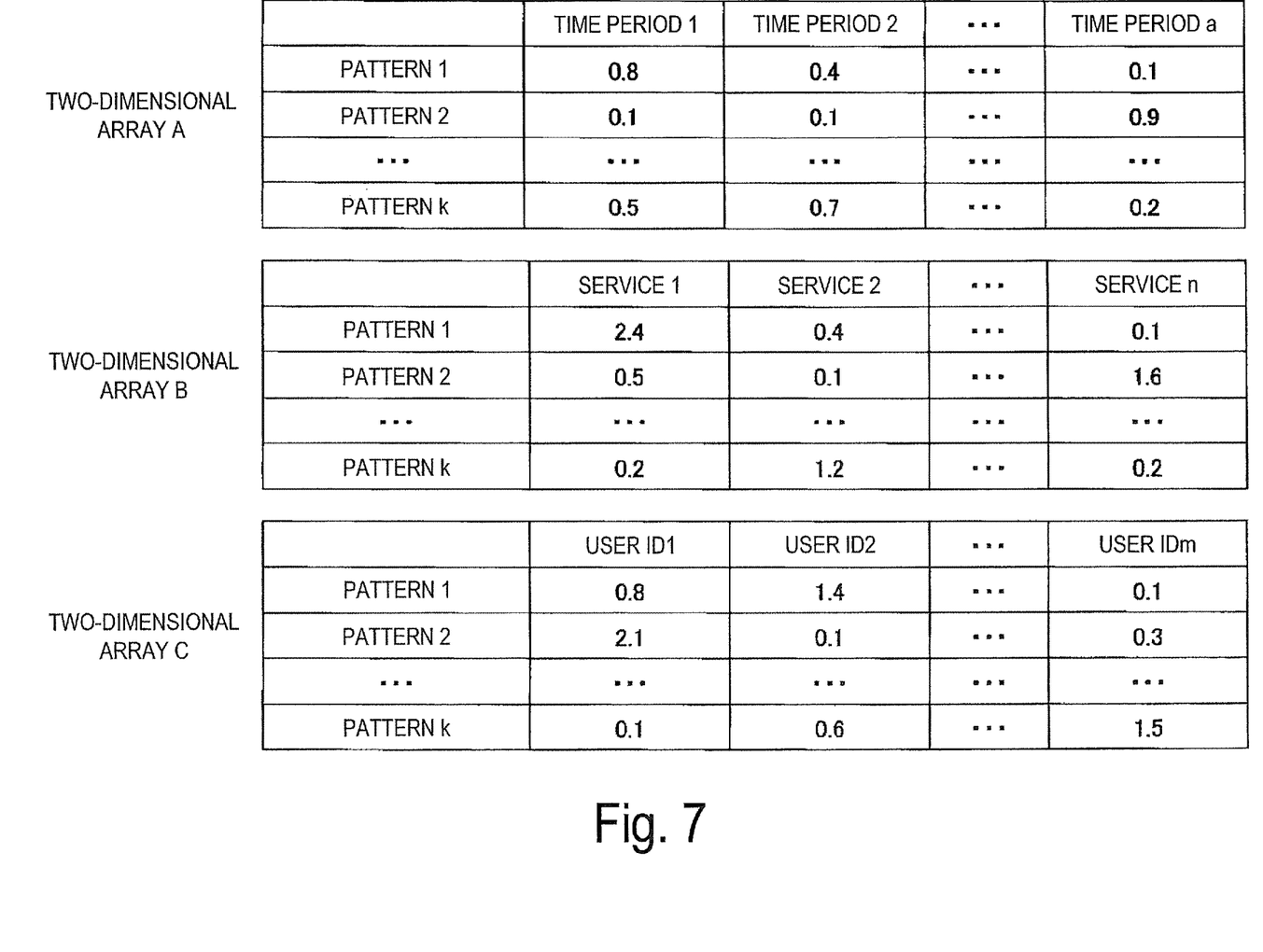
FIG. 7 is a diagram illustrating an example of output results according to a pattern extraction technique.

FIG. 7 is a diagram illustrating an example of output results according to a pattern extraction technique. As illustrated in FIG. 7, each of the two-dimensional arrays represents degrees of relevance between an item of each axis of the three-dimensional array X and an arbitrary number k of representative access patterns. Among them, k time series variations can be acquired from the two-dimensional array A having the time period and each access pattern as axes. In addition, a service name and a user ID that become a base of extraction of each access pattern can be acquired from the two-dimensional array B having the service name and each access pattern as its axes and the two-dimensional array C having the user ID and each access pattern as it axes. Here, k is an arbitrary number that is set in advance by a person performing an analysis.

As the pattern extraction technique, an arbitrary technique may be used as long as it is a technique that can extract degrees of relevance between each axis and patterns using a three-dimensional array as its input such as Non-negative Tensor Factorization (NTF), "Non-negative Tucker Decomposition (NTD), or the like. Regarding NTF, for example, "Welling, Max, and Markus Weber. 'Positive Tensor Factorization.' Pattern Recognition Letters 22.12 (2001): 1255-1261." or the like may be used. In addition, regarding NTD, for example, "Kim, Yong-Deok, and Seungjin Choi. 'Non-negative Tucker Decomposition.' Computer Vision and Pattern Recognition, 2007. CVPR'07. IEEE Conference on. IEEE, 2007." or the like may be used. FIG. 7 illustrates an example of output results in a case where traffic logs are analyzed using NTF.

Subsequently, the classification unit 12 groups user IDs or combinations of the user ID and the service name by using the two-dimensional arrays A, B, and C, which are output results of the pattern extraction technique, as input data (S104).

Figure 8:
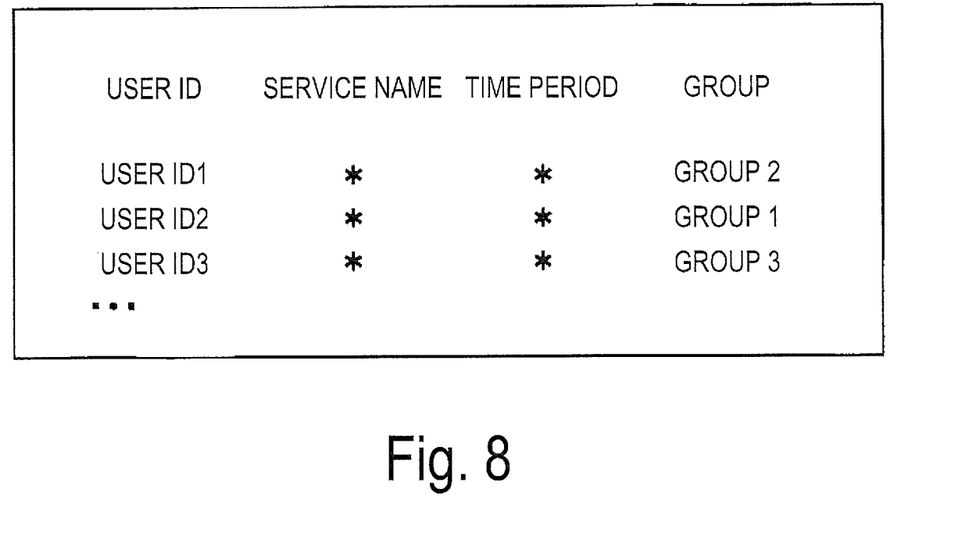
FIG. 8 is a first diagram illustrating an example of results of grouping.

First, the classification unit 12 associates each of the elements of the user ID, the service name, and the time period with a group based on the degrees of relevance using the two-dimensional arrays A, B, and C that are output results of the pattern extraction technique. For example, in the two-dimensional array C, in a case where a pattern having a highest degree of relevance to a user IDw is a pattern z, the classification unit 12 outputs a combination of the user IDw and the group z. In other words, the user IDw is associated with the group z. Here, a pattern is replaced by a group as is. In other words, it is regarded that the pattern z=the group z. An example of results of the grouping in this method is illustrated in FIG. 8. For example, a user ID1 of the two-dimensional array C illustrated in FIG. 7 has a maximum feature quantity of a pattern 2, and thus, in FIG. 8, the user ID1 is associated with a group 2. In this case, the time period and the service name are not directly considered and thus are represented as wildcards.

Figure 9:
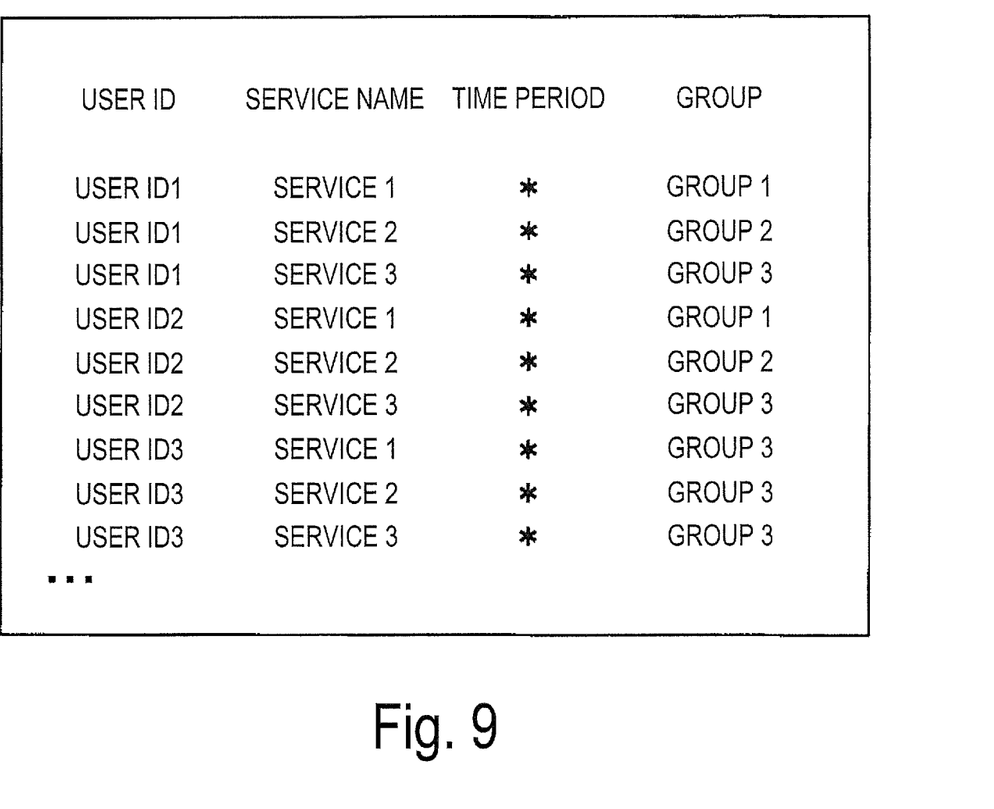
FIG. 9 is a first diagram illustrating an example of results of grouping.

On the other hand, as a method of grouping based on the two-dimensional arrays B and C, for example, there is a method of associating a service name and a user ID with a pattern for which a product of a degree of relevance of the service name and a degree of relevance of the user ID is a maximum. For example, in a case where a pattern corresponding to a group associated with a service name i that is an element of the two-dimensional array B and a user IDj that is an element of the two-dimensional array C is a pattern p, a group(i, j) is a group p that has max((i, p)·(j, p)). An example of results of grouping in this method is illustrated in FIG. 9. Similarly, grouping can be performed based on the two-dimensional arrays A and C, and in this case, grouping that differs in accordance with a time period can be performed.

Subsequently, for each group, the assignment unit 13 assigns a new IP address to a corresponding one of a plurality of the user terminals 20 relating to each user ID belonging to the group (S105). In more detail, for each group, the assignment unit 13 assigns an IP address belonging to the same subnetwork to a corresponding one of a plurality of the user terminals 20 relating to each user ID. More specifically, for example, the assignment unit 13 assigns IP addresses in the range of a.a.a.1 to a.a.a.254 to a plurality of the user terminals 20 relating to user IDs associated with a group 1 and assigns IP addresses in the range of a.a.b.1 to a.a.b.254 to a plurality of the user terminals 20 relating to user IDs associated with a group 2. In accordance with this, a.a.a.0, a.a.b.0, and the like are registered in the routing table, and the number of registrations is the number of groups.

Figure 10:
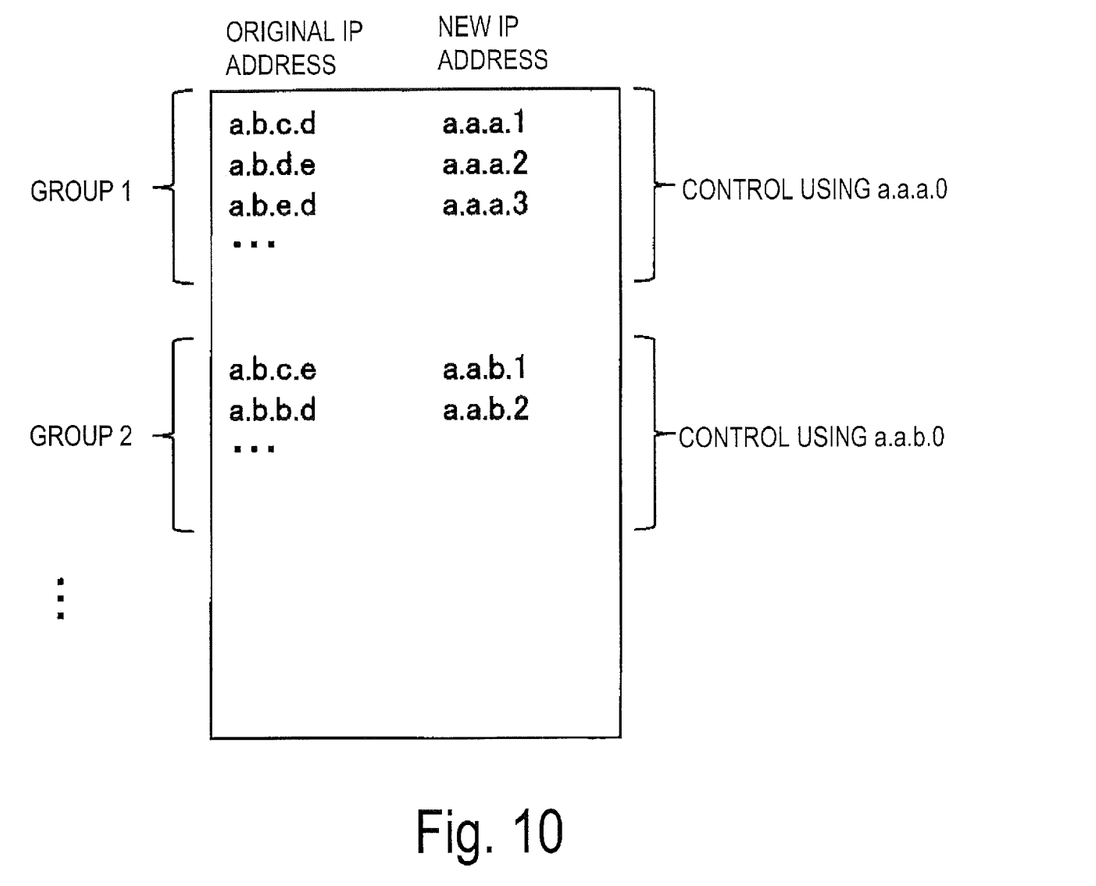
FIG. 10 is a first diagram illustrating an example of assignment results.

FIG. 10 is a first diagram illustrating an example of assignment results. In FIG. 10, each row corresponds to a corresponding one of a plurality of the user terminals 20. In other words, in FIG. 10, for each user terminal 20, an original IP address (an original user ID), and a newly assigned (i.e., changed) IP address (user ID) are illustrated.

Figure 11:
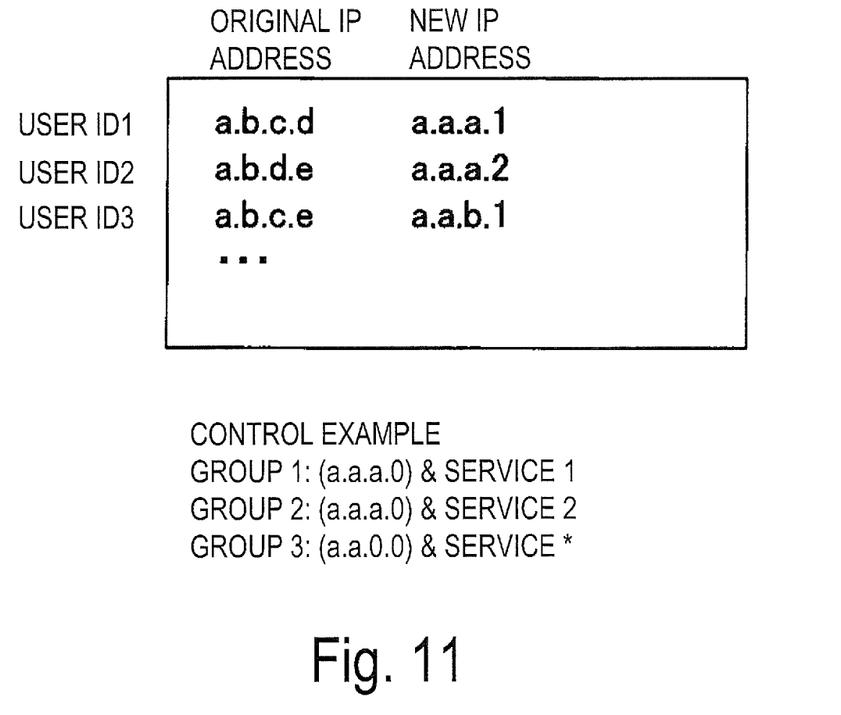
FIG. 11 is a second diagram illustrating an example of assignment results.

In addition, an example of assignment results in a case where the service name is considered as in the case illustrated in FIG. 9 is illustrated in FIG. 11. On an upper side of FIG. 11, similar to FIG. 10, an original IP address and a newly-assigned IP address are represented for each of the user terminals 20. Even in the case of being grouped as illustrated in FIG. 9, for each group, IP addresses belonging to the same subnetwork are assigned to the user terminals 20. Here, the control (routing control and the like) in the case of being grouped as illustrated in FIG. 9, as illustrated on a lower side of FIG. 11, may be performed in units of a combination of a subnetwork of each group and a service name. In addition, in a case where grouping that differs for each time period is performed, for example, the control can be realized by setting a lease period of DHCP according to a time period.

In addition, in a case where grouping is regularly performed (in other words, in a case where the processing sequence illustrated in FIG. 5 is regularly executed), for example, the assignment unit 13 may assign, to a corresponding one of a plurality of the user terminals 20 (hereinafter referred to as "a variation user terminal") associated with "a different group" that is different from groups of the latest N times (here, N is an integer equal to or larger than 1) in the past, an IP address of a subnetwork other than a subnetwork assigned to a group associated with the variation user terminal. The other subnetwork may be common to a group of variation user terminals. For example, the assignment unit 13 assigns an IP address a.b.c.0 that has not been assigned to any group to the group of variation user terminals. Thus, control is performed by registering the IP address assigned in this way in the routing table for the group of variation user terminals. As a result, a user group of which an access trend is dynamic and of which requested communication quality cannot be easily acquired can be controlled as a group. An IP address of a user ID that is new and thus has an uncertain access trend may also be regarded as an IP address of a group of variation user terminals.

Here, "different" in "a different group" does not mean that group numbers are different but means that features of groups are different. Whether features are the same or different may be determined based on the commonality of the group of the user terminals 20 constituting a group. For example, when 90% or more of a group of the user terminals 20 constituting a previous group a are included in a group of the user terminals 20 constituting a current group b, the current group b may be determined to be the same group as the previous group a. Here, whether a plurality of the user terminals 20 constituting a group of the user terminals 20 are the same or different may be determined based on information (the original IP address and the new IP address) illustrated in FIG. 10. On the other hand, in a case where grouping is performed as illustrated in FIG. 9, whether groups are the same or different may be determined based on whether service names associated with groups are the same or different.

In addition, at the time of controlling traffic such as routing, when the amount of traffic in units of groups becomes very large, flexibility of the control is lost. For example, the amount of traffic in units of groups should be prevented from exceeding a link band of the path. Thus, in a case where a group is large, the group may be divided into subgroups, and a control rule may be set to each subgroup. In particular, a group is taken in units of subnetworks, and thus, by performing control in units of subnetworks that are smaller, the flexibility of the control can be maintained. In addition, one group may be formed by integrating small groups. The size of a group may be determined based on the number of user IDs belonging to the group or may be determined based on collection results of statistics for each group illustrated in FIG. 6.

Next, a second embodiment is described. In the second embodiment, points different from those of the first embodiment are described. The points that are not specifically mentioned in the second embodiment may be the same as those of the first embodiment.

Figure 12:
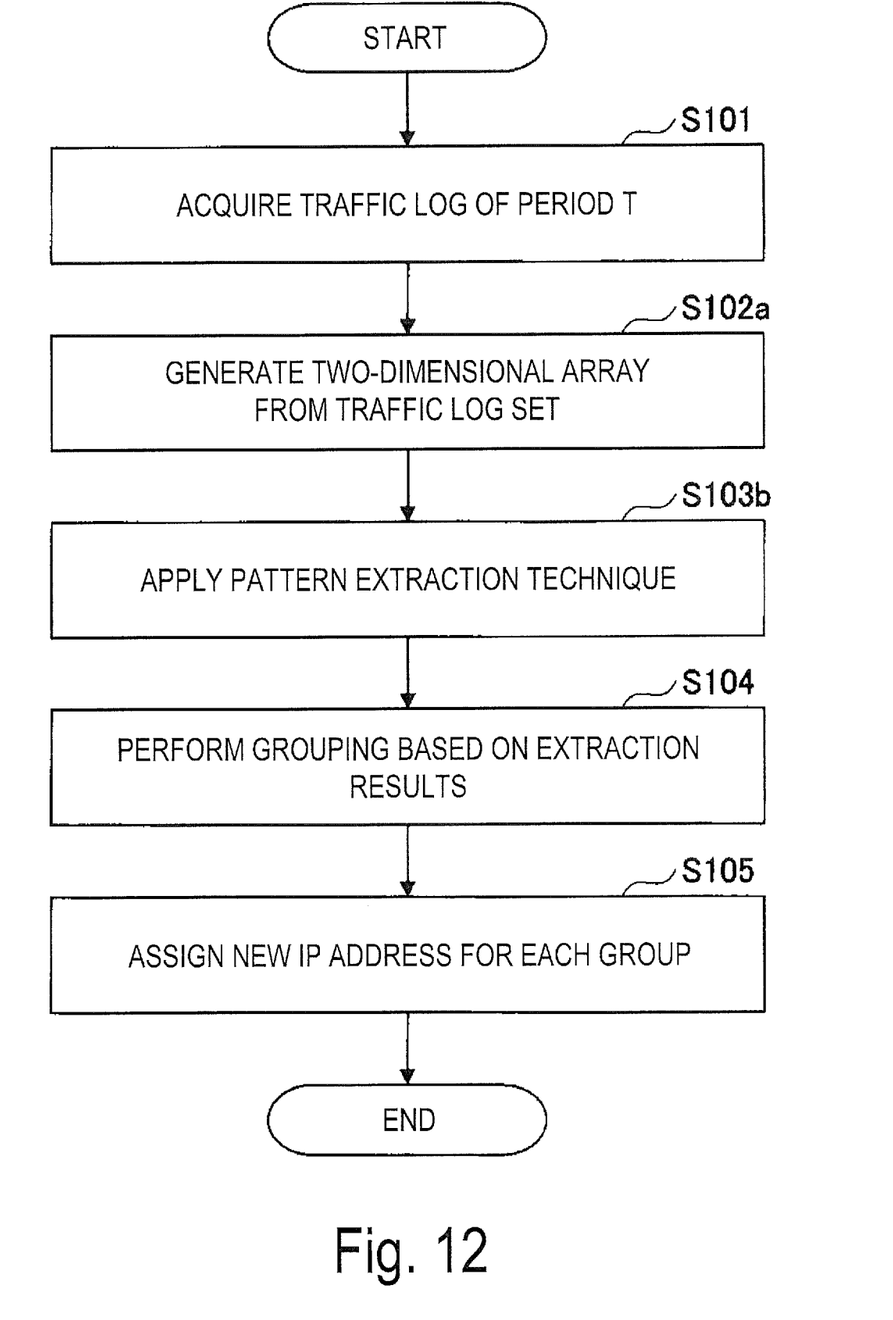
FIG. 12 is a flowchart illustrating an example of a processing sequence executed by an IP address assigning device 10 according to a second embodiment.

FIG. 12 is a flowchart illustrating an example of a processing sequence executed by an IP address assigning device 10 according to a second embodiment. In FIG. 12, the same steps as those in FIG. 5 are denoted by the same step numbers, and description thereof will be omitted. In FIG. 12, steps S102 and S103 illustrated in FIG. 5 are replaced with steps S102a and S103a.

In step S102a, a pattern extracting unit 11 generates a two-dimensional array X2 (time period×user ID or time period×service name) for a set of acquired traffic logs.

Subsequently, the pattern extracting unit 11 applies a pattern extraction technique using the data (the two-dimensional array X2) generated in step S102a as input data (S103a). As output results according to the pattern extraction technique, two two-dimensional arrays of two-dimensional arrays A and C or two-dimensional arrays B and C are acquired. Each of the two-dimensional arrays that are the output results represents degrees of relevance between items of axes of X2 and an arbitrary number k of representative access patterns (user·traffic time series variation or service·traffic time series variation). In this case, an arbitrary pattern extraction technique such as Non-negative Matrix Factorization (NMF) or the like may be used as long as it can extract degrees of relevance between items of axes of the array and patterns using two-dimensional arrays as inputs. After the pattern extraction technique is used, a process similar to that according to the first embodiment may be executed. In this way, IP addresses can be assigned in units of groups based on access patterns of users.

A series of models (processing sequences) described with reference to FIGS. 5 and 12 can be implemented using an arbitrary programming language or a script language or a combination thereof.

As described above, according to each of the above-described embodiments, by grouping traffic having similar requested communication qualities and assigning IP addresses such that the same subnetwork is formed in units of groups, registration information required for controlling the traffic can be reduced. As a result, this can contribute to traffic control in which traffic occurrence patterns of services and users are perceived.

In this embodiment, the pattern extracting unit 11 is one example of an extraction unit.

Hereinbefore, although the embodiment of the present invention has been described, the present invention is not limited to such specific embodiments, and can be modified and changed variously without departing from the scope of the invention described in the appended claims.

REFERENCE SIGNS LIST

10 IP address assigning device
11 Pattern extracting unit
12 Classification unit
13 Assignment unit
20 User terminal
30 Traffic collection device
40 DHCP server
50 DNS server
100 Drive device
101 Recording medium
102 Auxiliary storage device
103 Memory device
104 CPU
105 Interface device
B Bus

The invention claimed is:

1. An IP address assigning device comprising:
a processor; and
a memory that includes instructions, which when executed, cause the processor to execute the following steps:
calculating, for traffic between a plurality of user terminals and a plurality of services in a past period, a statistic of the traffic for each of a plurality of combinations of a user terminal, a service, and a time period, and extracting a plurality of patterns relating to the traffic based on a plurality of the statistics;
classifying the plurality of user terminals into a plurality of groups based on the patterns;
assigning IP addresses belonging to a subnetwork to corresponding ones of the plurality of user terminals for each of the plurality of groups; and
performing routing control for the plurality of groups according to the assigned IP addresses.

2. The IP address assigning device according to claim 1, wherein, for a user terminal that is one of the plurality of user terminals and that is classified into different groups in a first period and a second period after the first period, in the second period, the step of assigning assigns to the user terminal an IP address belonging to a subnetwork other than that of a group into which the user terminal has been classified.

3. An IP address assigning method executed by a computer, the method comprising:
calculating, for traffic between a plurality of user terminals and a plurality of services in a past period, a statistic of the traffic for each of a plurality of combinations of a user terminal, a service, and a time period, and extracting a plurality of patterns relating to the traffic based on a plurality of the statistics;
classifying the plurality of user terminals into a plurality of groups based on the patterns;
assigning IP addresses belonging to a subnetwork to corresponding ones of the plurality of user terminals for each of the plurality of groups; and
performing routing control for the plurality of groups according to the assigned IP addresses.

4. The IP address assigning method according to claim 3, wherein, for a user terminal that is one of the plurality of user terminals and that is classified into different groups in a first period and a second period after the first period, in the second period, the assigning assigns to the user terminal an IP address belonging to a subnetwork other than that of a group into which the user terminal has been classified.

5. A non-transitory storage medium storing a program for causing a computer to execute:
calculating, for traffic between a plurality of user terminals and a plurality of services in a past period, a statistic of the traffic for each of a plurality of combinations of a user terminal, a service, and a time period, and extracting a plurality of patterns relating to the traffic based on a plurality of the statistics;
classifying the user terminals into a plurality of groups based on the patterns;
assigning IP addresses belonging to a subnetwork to corresponding ones of the plurality of user terminals for each of the plurality of groups; and
performing routing control for the plurality of groups according to the assigned IP addresses.

6. The non-transitory storage medium according to claim 5, wherein, for a user terminal that is one of the plurality of user terminals and that is classified into different groups in a first period and a second period after the first period, in the second period, the assigning assigns to the user terminal an IP address belonging to a subnetwork other than that of a group into which the user terminal has been classified.

* * * * *